United States Patent [19]
Omtzigt

[11] Patent Number: 6,160,559
[45] Date of Patent: Dec. 12, 2000

[54] METHOD AND APPARATUS FOR PROVIDING FRAME-TIME FEEDBACK TO GRAPHICS APPLICATION PROGRAMS

[75] Inventor: E. Theodore L. Omtzigt, El Dorado Hills, Calif.

[73] Assignee: Intel Corporation, Santa Clara, Calif.

[21] Appl. No.: 08/940,679

[22] Filed: Sep. 30, 1997

[51] Int. Cl.[7] .............................. G06F 15/16; G06T 17/00
[52] U.S. Cl. ..................... 345/503; 345/428; 345/433; 345/522
[58] Field of Search ........................... 345/418, 433–439, 345/441, 428, 473–475, 501–504, 522, 523

[56] References Cited

U.S. PATENT DOCUMENTS

| | | | |
|---|---|---|---|
| Re. 35,922 | 10/1998 | Cuzzo et al. ........................ | 358/1.14 |
| 5,138,561 | 8/1992 | Crowe ................................. | 395/103 |
| 5,157,765 | 10/1992 | Birk et al. .......................... | 345/506 |
| 5,384,908 | 1/1995 | Mackinlay et al. ................. | 345/475 |
| 5,444,839 | 8/1995 | Silverbrook et al. ............... | 345/441 |
| 5,471,563 | 11/1995 | Dennis et al. ...................... | 395/114 |
| 5,524,186 | 6/1996 | Campbell ............................ | 395/115 |
| 5,880,737 | 3/1999 | Griffin et al. ....................... | 345/430 |

*Primary Examiner*—Ulka J. Chauhan
*Attorney, Agent, or Firm*—Blakely, Sokoloff, Taylor & Zafman LLP

[57] ABSTRACT

A method and apparatus for rasterizing a geometric shape. A rasterizer is outfitted with a counter. The counter is started in the rasterizer and a geometric shape is rasterized in the rasterizer while the counter is counting. One or more signals are output from the rasterizer to indicate that a predetermined rasterization time for the geometric shape has been exceeded if the counter reaches a target count before rasterization of the geometric shape is completed.

14 Claims, 8 Drawing Sheets

METHOD AND APPARATUS FOR PROVIDING FRAME-TIME FEEDBACK TO GRAPHICS APPLICATION PROGRAMS

FIELD OF THE INVENTION

The present invention relates to the field of computer graphics, and more particularly to rasterizing graphics objects within a desired frame-time.

BACKGROUND OF THE INVENTION

Computer systems that display two-dimensional (2D) images of three-dimensional (3D) scenes typically include a sequence of image processing stages collectively referred to as a graphics pipeline. In some systems, one or more stages of the graphics pipeline are implemented by a programmed host processor. Other stages, such as rasterization and video signal generation stages, are usually implemented in dedicated hardware.

A most cases a graphics pipeline includes a geometry transformation stage, a rasterization stage and a video signal generation stage. In the geometry transformation stage, coordinates of objects in a 3D scene are mathematically transformed into a set of 2D coordinates. The effect of this transformation is to project the 3D scene onto an image plane that is positioned to achieve a given perspective view. The set of 2D coordinates are further processed into coordinates that define regions of homogeneous color and texture. These region-defining coordinates are then supplied to the rasterization stage where they are processed by a rasterizer.

The rasterizer determines which pixels on the computer display need to be updated for each set of region-defining coordinates received from the geometry transformation stage. This is accomplished by comparing the coordinates of pixels on the display against region boundaries to determine whether a given pixel is inside or outside the region. If a pixel is completely or partially inside the region, the rasterizer computes a shading value (a color or gray-scale value) for the pixel and writes the shading value to a storage location in a frame buffer that maps the pixel on the display. If a pixel is not inside or partially inside the region, the corresponding frame buffer location is not updated.

In the video signal generation stage, a video signal generator, sometimes referred to as a "video engine", continually scans the frame buffer to generate a video signal. In many cases, the video signal generator uses the frame buffer data to look up more resolute color values in color look-up tables, and then uses the more resolute color values to index yet other look-up tables to generate color data adjusted to account for the characteristics of a particular display.

One disadvantage of prior-art graphics pipelines is that the frame-rate tends to fluctuate based on the graphic complexity of the scene being displayed. For example, scenes having greater graphic complexity (e.g., relatively large number of objects, clipped objects, off-axis orientation of objects, object occlusion, alpha blending, complex shading or texture, etc.) take longer to rasterize than scenes having less graphic complexity. Thus, when a scene contains only a few, relatively low-detail graphics objects, the frame rate is relatively fast. As the number of objects or the graphical detail of the objects increases, the frame rate slows down.

In some prior-art graphics pipelines, the frame-rate can fluctuate between as much as one-third to three-times the average frame rate. Such frame-rate fluctuations are highly distractive to a human operator and produce the sensation of moving between slow-motion and fast-forward. In application programs that require hand-eye coordination (e.g., video games), frame-rate fluctuations make it difficult for users to calibrate their hand or finger motions to events in the displayed images.

Another disadvantage of prior-art systems is that, particularly in systems that rely on the host processor to implement one or more stages of the graphics pipeline, the frame-rate tends to vary based on the processing capability of the host platform. That is, less computationally powerful systems tend to exhibit slower frame-rates because the host processor takes longer to perform graphics processing.

In one prior-art technique for addressing disparities in processing capability, called "level-of-detail management" multiple instances of graphics objects are provided, with each instance of a given graphics object being progressively more graphically complex than another instance. For example, in a combat-type video game in which the player and computer respectively control the on-screen motions of combatant characters, each of the characters are typically stored in multiple instances having incrementally different levels of graphical detail. When the game program is started, the processing capability of the computer system is determined and character instances having an appropriate level of graphical complexity are selected for display.

Unfortunately, the above-described technique does not address frame-rate fluctuations caused by varying graphical complexity between scenes or frame-rate fluctuations caused by time-varying graphical complexity within a single scene. Further, for multi-tasking computer systems in which processing capability is time-varying function of processor loading, application programs which statically select a level of graphical complexity are still subject to frame-rate fluctuations as the host processor starts and stops executing other tasks.

SUMMARY OF THE INVENTION

A method and apparatus for rasterizing a geometric shape is disclosed. A counter is started in a rasterizer and a geometric shape is rasterized in the rasterizer while the counter is counting. If the counter reaches a target count before rasterization of the geometric shape is completed, one or more signals are output from the rasterizer to indicate that a predetermined rasterization time for the geometric shape has been exceeded.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to one embodiment of the present invention, frame-rate fluctuation is avoided by notifying application programs when graphics objects in a scene cannot be rasterized within a predetermined time. This notification is referred to herein as "frame-time feedback" and can be used by application programs to progressively reduce the complexity of a scene until a desired frame-rate is achieved.

To provide frame-time feedback to an application program, a rasterizer in the graphics pipeline is modified to include an elapsed time counter. The elapsed-time counter is loaded with a target count representing a target rasterization time prior to the rasterization of each graphics object in the scene. The elapsed-time counter is started when rasterization of a graphics object begins. If the elapsed-time counter reaches the target count before rasterization of the graphics object is completed, the rasterizer asserts one or more signals to indicate that the target rasterization time for the graphics object has been exceeded. The one or more signals may be an interrupt signal to interrupt the processor used to execute the application program, or a count value or status value output in response to a read operation initiated by the processor. In response to the one or more signals indicating that the target rasterization time has been exceeded, the scene-rendering application program may specify that graphics objects yet to be rasterized in the current frame are to be rasterized with less detail in order to render all of the graphics objects of a scene within a desired frame-time. If the target rasterization time is exceeded for yet another graphics object in the frame, even less detail may be selected for the remaining graphics objects. In this way, scene complexity may be progressively reduced to ensure that all graphics objects within a given scene are rasterized within an allotted time and so that a relatively constant frame-rate is achieved.

Figure 1:
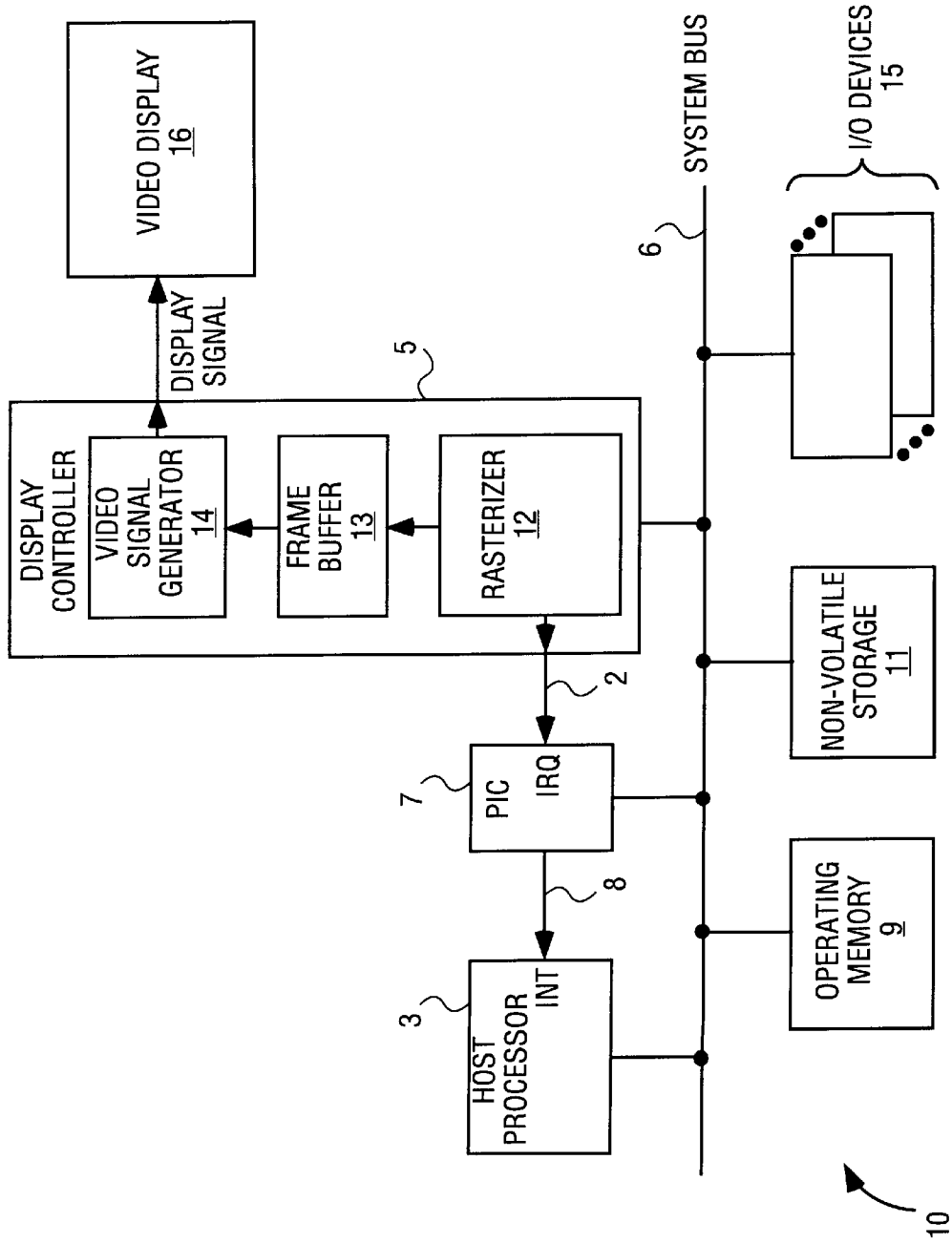
FIG. 1 is a block diagram of a computer system.

FIG. 1 is a block diagram of a computer system 10, according to one embodiment of the present invention. The computer system includes a host processor 3, an operating memory 9, a programmable interrupt controller (PIC) 7, a display controller 5, a non-volatile storage 11 and various I/O devices 15, all interconnected by a system bus 6. The computer system 10 also includes a video display 16 that displays a video image based on a video signal received from the display controller 5.

The I/O devices 15 generally include devices for receiving user-input such as a keyboard and a cursor control device, and may also include other devices for supporting specific functionality. For example the I/O devices 15 may include a network connection device such as a modem or area network card, a printer or other hardcopy device, an image scanner, sound generation hardware, and so forth.

The non-volatile storage 11 typically includes a number of non-volatile memory devices including a non-volatile semiconductor memory to hold a boot program, and any number of mass storage devices, such as magnetic and optical storage devices. When computer system 10 is powered up, the boot program is executed by the host processor 3 to load program code from a mass storage device into the operating memory 9. The program code loaded into the operating memory 9 is then executed to load at least the necessary portions of operating system program code from the mass storage device into the operating memory 9. The operating system program code is then executed by the host processor 3 to interact with a human operator through one or more of the I/O devices 15, such as a mouse and keyboard. The operator may enter a request to execute a graphics application program that is stored on a mass storage device.

A graphics application program that renders 3D scenes onto the video display often includes program code which, when executed by the host processor 3, causes the host processor 3 to perform the functions of a geometry transformer. That is, application program code is executed by the host processor to generate coordinates of graphics objects in a 3D scene and then to decompose the graphics objects into a set of geometric shapes. The geometric shapes are then supplied to the display controller 5 for processing.

The display controller 5 includes a rasterizer 12, a frame buffer 13 and a video signal generator 14. According to one embodiment of the present invention, the rasterizer 12 receives data from the host processor 3 that defines geometric shapes to be rasterized along with elapsed-time counts corresponding to the geometric shapes. As discussed below, each elapsed time count represents a target rasterization time within which the corresponding graphics object is to be rasterized.

In many computer systems, the rasterizer 12 is designed to rasterize only one geometric shape, usually a triangle. Each triangle is defined by three vertices, each having an associated color. The vertices and their respective colors are used by the rasterizer 12 to determine which pixels to update and which color to use for the pixel update. For the remainder of this description the geometric shapes supplied to the rasterizer 12 are assumed to be triangles, each being defined by vertices having associated color values. It will be appreciated, however, that any geometric shape or set of geometric shapes may be supplied to the rasterizer 12 without departing from the spirit and scope of the present invention. Also, while a color implementation is described any type of shading may be used in the present invention, including gray-scale shading.

The rasterizer 12 determines which pixels of the video display 16 are to be updated by comparing screen coordinates of pixels against triangle boundaries to determine whether a given pixel is within a triangle. If the pixel is completely or partially inside the triangle, the rasterizer 12 computes a shading value (a color or gray-scale value) for the pixel and writes the shading value to a storage location in the frame buffer 13 that maps the pixel on the video display. If a pixel is not inside the triangle, the corresponding frame buffer location is not updated.

It will be appreciated that for a given graphics object, the number of pixel-to-triangle boundary comparisons performed depends on the number of triangles into which the graphics object is resolved. Accordingly, the time required to rasterize a graphics object increases as the number of constituent triangles increases. More generally, the time required to rasterize a given graphics object increases with the object's graphical complexity. Factors affecting graphical complexity of a given object include, for example, the number of constituent triangles, the number of pixels in the object, the shading mode of the object (e.g., flat, Gourand, Phong, etc.) and the texture mode of the object (e.g., no texture, texture, wrapped texture, etc.).

As discussed above, some application programs are provided with multiple instances of graphics objects, with the instances of a given object exhibiting a progression of graphical complexity from least complex to most complex. Level-of-detail (LOD) management can then be performed by assessing the rasterization capability of the computer system at the start of program execution. As mentioned, there are significant drawbacks to this LOD management scheme, including inability to account for changes in graphical complexity from frame to frame or from scene to scene, and inability to account for changes in processor loading.

In one embodiment of the present invention, frame-time feedback is used to dynamically select from among graphics object instances of varied graphical complexity. This allows scene LOD to be managed during rasterization of each new video frame to achieve a relatively constant frame-rate even through variation in scene complexity and processor loading. In contrast to prior art schemes in which LOD management is essentially static and open-loop, the present invention provides dynamic, closed-loop LOD management to reduce frame-rate fluctuation.

In order to provide frame-time feedback in one embodiment of the present invention, the rasterizer 12 includes an interrupt request output 2 that is coupled to an interrupt request input (IRQ) of the PIC 7. The PIC 7 includes an interrupt output 8 that is coupled to an interrupt input (INT) of the host processor 3. When the rasterizer 12 asserts an interrupt request signal on the interrupt request output 2, the interrupt request is detected by the PIC 7, which in turn asserts an interrupt to the host processor 3. Upon being interrupted, the host processor 3 queries the PIC 7 to determine the address of an interrupt service routine (ISR) corresponding to the interrupt asserted by the rasterizer 12. As discussed further below, the ISR corresponding to the rasterizer interrupt may be used to provide frame-time feedback to a graphics application program.

Figure 2:
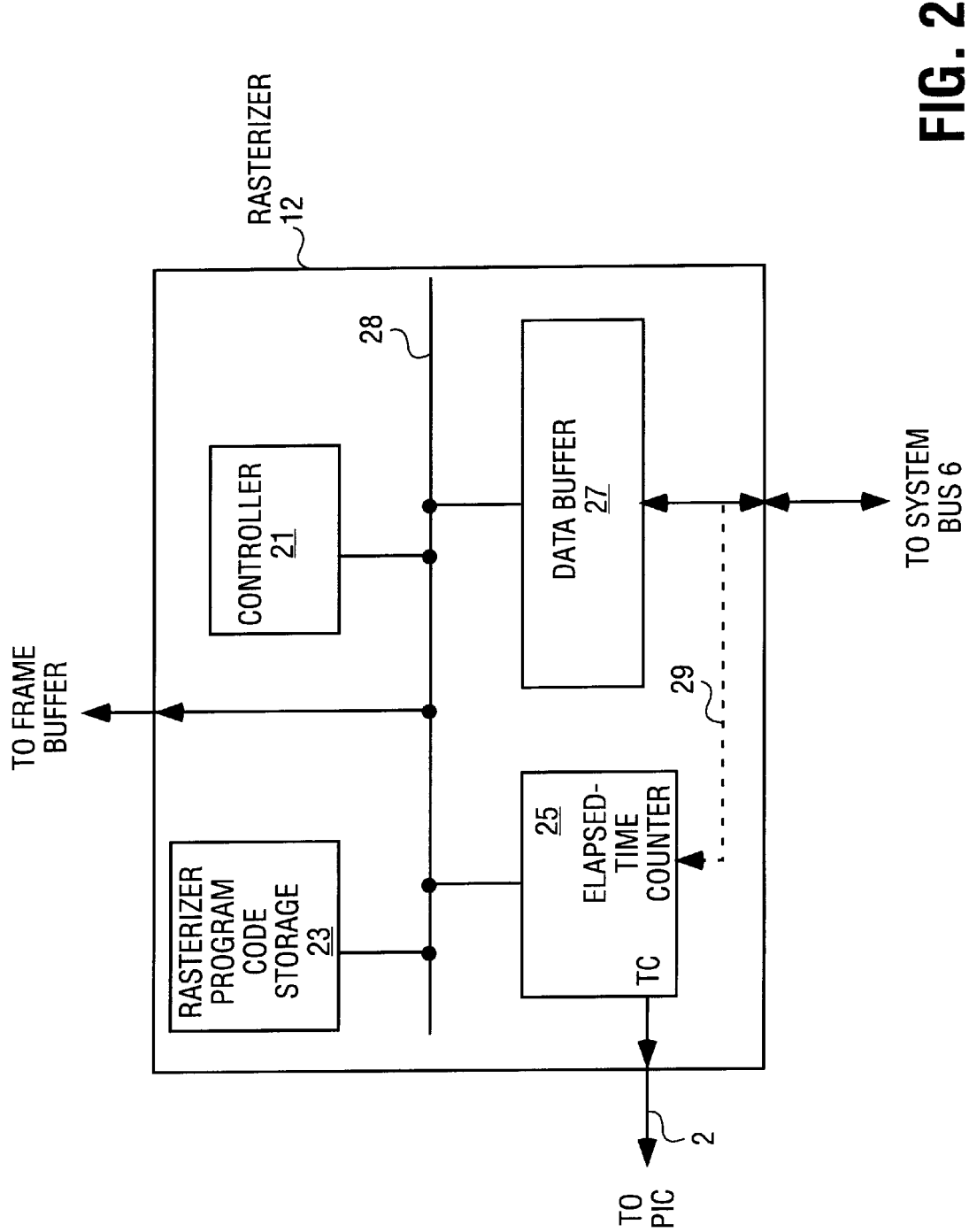
FIG. 2 is a block diagram of a rasterizer.

FIG. 2 is a block diagram of the rasterizer 12 of FIG. 1 according to one embodiment of the present invention. The rasterizer 12 includes a controller 21, data buffer 27, program code storage 23 and elapsed-time counter 25, all connected by an internal bus 28. The controller 21, which may be a general purpose processor, microcontroller or digital signal processor (DSP), executes program code stored in the program code storage 23 to rasterize graphics objects defined by data queued in the data buffer 27.

As shown in FIG. 2, data buffer 27 is coupled to both the system bus 6 and to the internal bus 28 of rasterizer 27. To support this operation a dual ported memory device is used. However, in an alternative embodiment of the present invention discussed below, arbitration logic may be coupled to the system bus 6 and the internal bus 28 to provide arbitrated access to the data buffer 27 via a single port.

In one embodiment of the present invention, a count value representing a target rasterization time is enqueued in the data buffer 27 along with definitional data for each graphics object to be rasterized. The elapsed-time counter 25 is loaded with a count value corresponding to a given graphics object just before rasterization of the graphics object is begun. The elapsed-time counter 25 is then started substantially simultaneously with rasterization of the graphics object. If rasterization of the graphics object is completed before the elapsed-time counter 25 expires (i.e., reaches a target count) the elapsed-time counter 25 is reloaded with the count value corresponding to the next graphics object to be rasterized. However, if the elapsed time-counter 25 expires before rasterization of the graphics object is completed, the elapsed-time counter 25 asserts a target count signal (TC) 2 that is used to interrupt the host processor. As discussed further below, the interrupt to the host processor serves to notify the graphics application program that the desired frame-rate may not be met unless the complexity of the scene being rasterized is reduced.

Still referring to FIG. 2, in an alternate embodiment of the present invention, the system bus 6 may also be coupled to the elapsed time counter 25 to allow the host processor (e.g., element 3 of FIG. 1) to poll the elapsed-time counter 25 to determine if a target rasterization time is exceeded. The system bus 6 connection to the elapsed time counter 25 is indicated by dashed line 29 to emphasize that this is an alternative embodiment. In yet another embodiment of the present invention, the elapsed time counter 25 may be accessed by the host processor via an arbitrated access to the internal bus 28 similar to the arbitrated access to the data buffer 27 discussed above. In either case, in response to a read request from the host processor, the elapsed-time counter 25 outputs a value to the host processor indicating whether the target count has been reached. The output value may be a status value, such as a flag indicating that the target count has or has not been reached, or the present count of the elapsed-time counter 25. If the output value is the present count, the host processor may itself compare the present count to the target count to determine if a target rasterization time has been exceeded.

Figure 3:
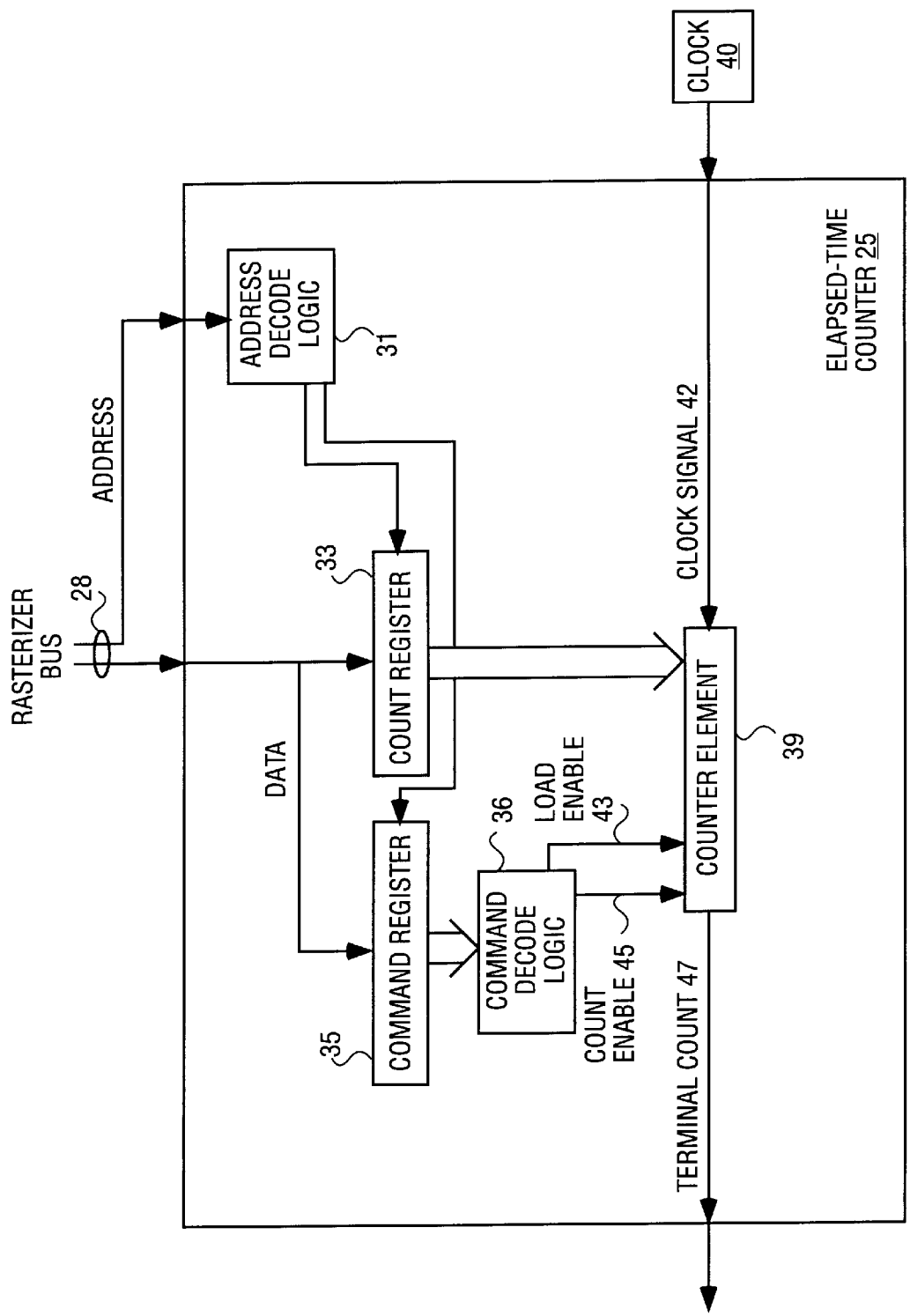
FIG. 3 is a block diagram of an elapsed-time counter according to a first embodiment of the present invention.

FIG. 3 is a block diagram of the elapsed-time counter 25 of FIG. 2 according to one embodiment of the present invention. The elapsed-time counter 25 includes a command register 35, a count register 33, command decode logic 36, address decode logic 31 and a counter element 39. A data portion of the rasterizer's internal bus 28 is coupled to supply commands and count values to the command register 35 and the count register 33, respectively. An address portion of the rasterizer's internal bus 28 is coupled to the address decode logic 31. Based on one or more bits within an address signal received on the address portion of the internal bus 28, the address decode logic 31 enables the command register 35 or the count register 33 to receive data from the data portion of the internal bus.

After a command is written to the command register 35, the command decode logic 36 decodes the command to generate control signals for the counter element 39. According to one embodiment of the present invention, the command decode logic 36 asserts a load enable signal 43 to the counter element 39 in response to a load command in the command register 35, and a count enable signal 45 to the counter element 39 in response to a count command in the command register 35. When the load enable signal 43 is asserted, the value present in the count register 33 is loaded into the counter element 39. Then, when the count enable signal 45 is asserted, the count value in the counter element 39 is decremented in response to either rising or falling edge transitions of a clock signal 42. According to one embodiment of the present invention, the clock signal 42 is generated by a clock element 40 that is external to the elapsed-time counter 25. In an alternative embodiment, the clock element 40 may instead be included in the elapsed-time counter 25.

So long as the count enable signal 45 is asserted, the counter element 39 continues to decrement the count value therein until a target count of zero is reached. When the target count is reached, target count logic within the counter element 39 generates a target count signal 47. As discussed above, the target count signal 47 can then be used to provide an interrupt request output (e.g., signal 2 of FIG. 1) from the rasterizer.

Figure 4:
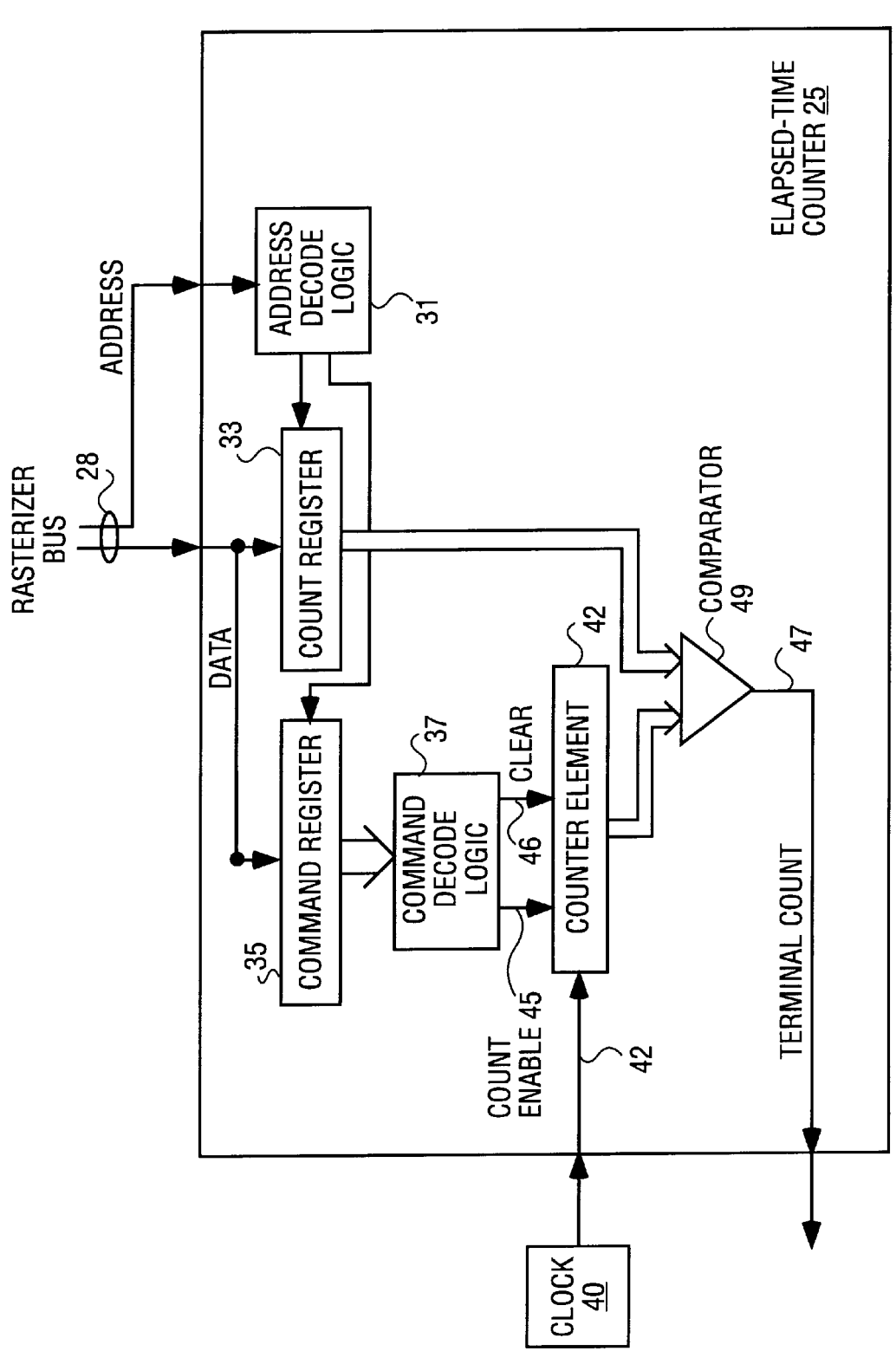
FIG. 4 is a block diagram of an elapsed-time counter according to a second embodiment of the present invention.

FIG. 4 is a block diagram of the elapsed-time counter 25 according to an alternate embodiment of the present invention. Instead of a counter element that decrements a count value loaded from the counter register, the elapsed-time counter 25 contains an up-counter 42 that increments from zero to a target count stored in the count register 33. The address decode logic element 31 operates as discussed above to enable command values to be received in the command register 35 and count values to be received in the count register 33. However, instead of asserting a load enable signal in response to a load command, the command decode logic 37 asserts a clear signal 46 to zero the counter element 42 in response to a clear command. Then, when the count enable signal 45 is asserted, the counter element 42 begins incrementing the count value therein in response to transitions of the clock signal 42 from clock 40. The output of the counter element 42 and the target count stored in the count register 33 are compared in a comparator 39. When the count output by the counter element 42 matches the target count, a target count signal 47 is asserted at the comparator output.

Figure 5:
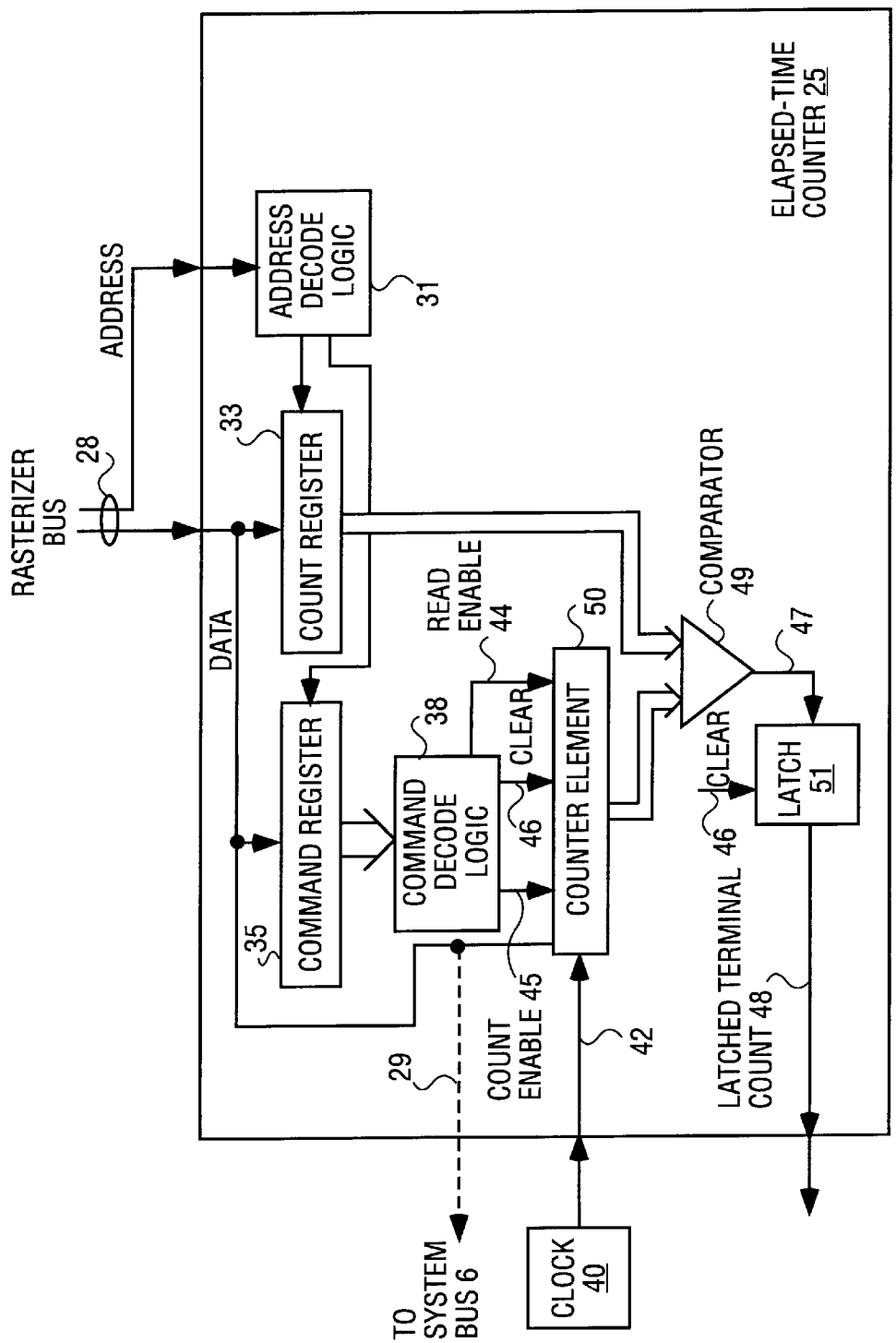
FIG. 5 is a block diagram of an elapsed-time counter according to a third embodiment of the present invention.

FIG. 5 is a block diagram of the elapsed-time counter 25 according to yet another embodiment of the present invention. The command register 35, count register 33, address decode logic 31 and comparator 39 perform the functions described above in reference to FIG. 4. However, the command decode logic 38 and the counter element 50 have been modified to allow the count value present in the counter element 50 to be enabled onto the data portion of the rasterizer bus 28 in a read operation. When a read command is written to the command register 35, the command decode logic 38 decodes the read command to assert a read enable signal 44 to the counter element 50. In response to the read enable signal 44, the counter element 50 outputs the present count value onto the data portion of the rasterizer's internal bus 28. The present count value can then be read by the rasterizer controller (element 21 of FIG. 2) and then stored in the rasterizer data buffer (element 27 of FIG. 2) for access by the host processor. By establishing a protocol whereby the host processor stores requests to read the elapsed-time counter 25 in the rasterizer data buffer and receives elapsed-time counts in response, it becomes possible for the host processor to poll the elapsed-time counter 25 to determine the amount of time required to completely rasterize a graphics object. In other words, using the elapsed-time counter 25 of FIG. 5, it becomes possible to determine not only that rasterization of a graphics object was not completed within the target time, but also the amount of additional time required to rasterize the graphics object.

Still referring to FIG. 5, a latch 51 is provided to generate a latched target count signal 48 that remains asserted even after the target count signal 47 has been deasserted at the output of comparator 49. This way, even after the count value in counter element 50 is incremented past the target count stored in the count register 33, thereby causing the target count signal 47 to be deasserted by the comparator 49, the latched target count signal 48 remains asserted to interrupt the host processor. As shown in FIG. 5, the latched target count signal 48 output by the latch 51 is deasserted in response to a clear signal 46 from the command decode logic 38.

According to an alternative embodiment of the present invention, the counter element 50 is coupled to the system bus 6 to directly output the present count value in response to a read command in command register 35. This is indicated in FIG. 5 by the dashed-line 29. In this way, a read request by the host processor results in the present count value being asserted on the system bus 6. Thus, according to alternative embodiments, the elapsed-time counter 25 may output the present count value to the host processor via the system bus 6 directly or via the internal bus 28 to the system bus 6. Also, in another embodiment, the elapsed-time counter 25 or other logic within the rasterizer may generate a flag value indicating whether or not the target count has been reached. The processor may then receive the flag value instead of the present count value.

Figure 6:
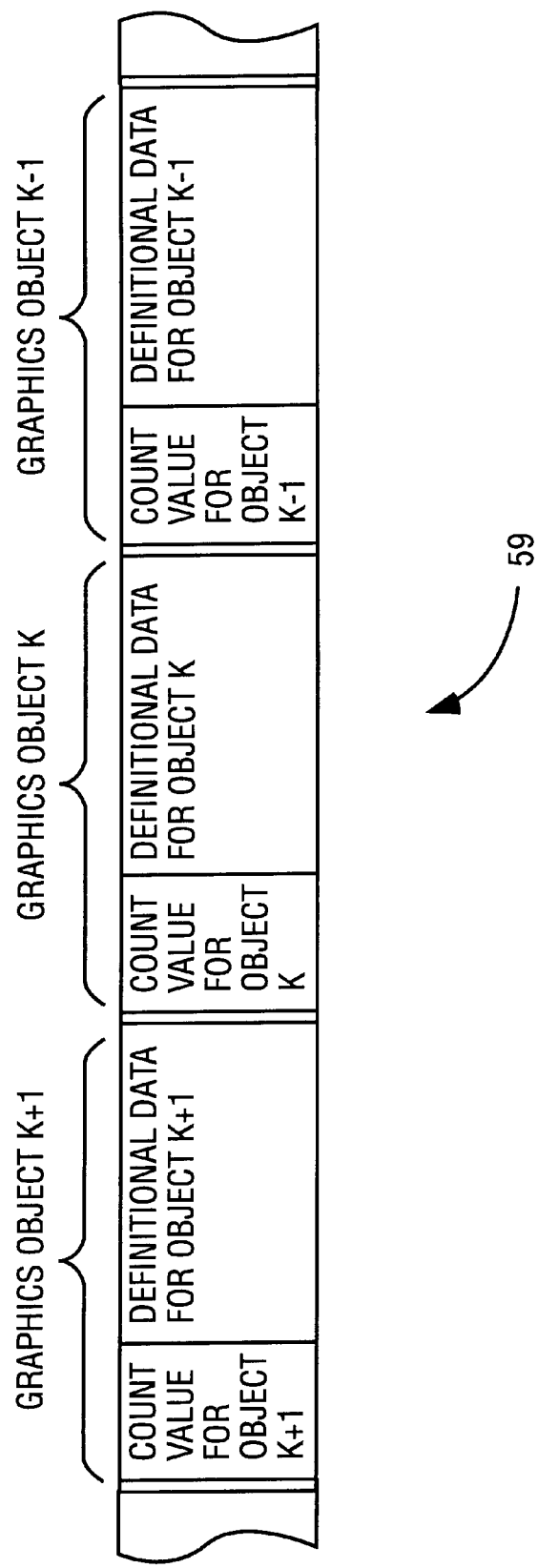
FIG. 6 illustrates a queue of data transferred from a host processor to a rasterizer.

FIG. 6 illustrates a queue 59 of data transferred from the host processor to the rasterizer (e.g., element 12 of FIG. 1) and stored in the rasterizer data buffer (e.g., element 27 of FIG. 2). As shown, each graphics object is described by a queue entry that includes definitional data and a count value representing a target rasterization time. According to one embodiment of the present invention, the count value indicates the number of clock signal transitions that must take place in the elapsed time counter (e.g., element 25 of FIG. 2) before reaching a target count. Entries are enqueued in the rasterizer data buffer by the host processor and are dequeued for rasterization by the rasterizer controller (e.g., element 21 of FIG. 2). Although a queue data structure is shown in FIG. 6, any data structure allowing the host processor to communicate definitional data and target rasterization times to the rasterizer may be used.

Figure 7:
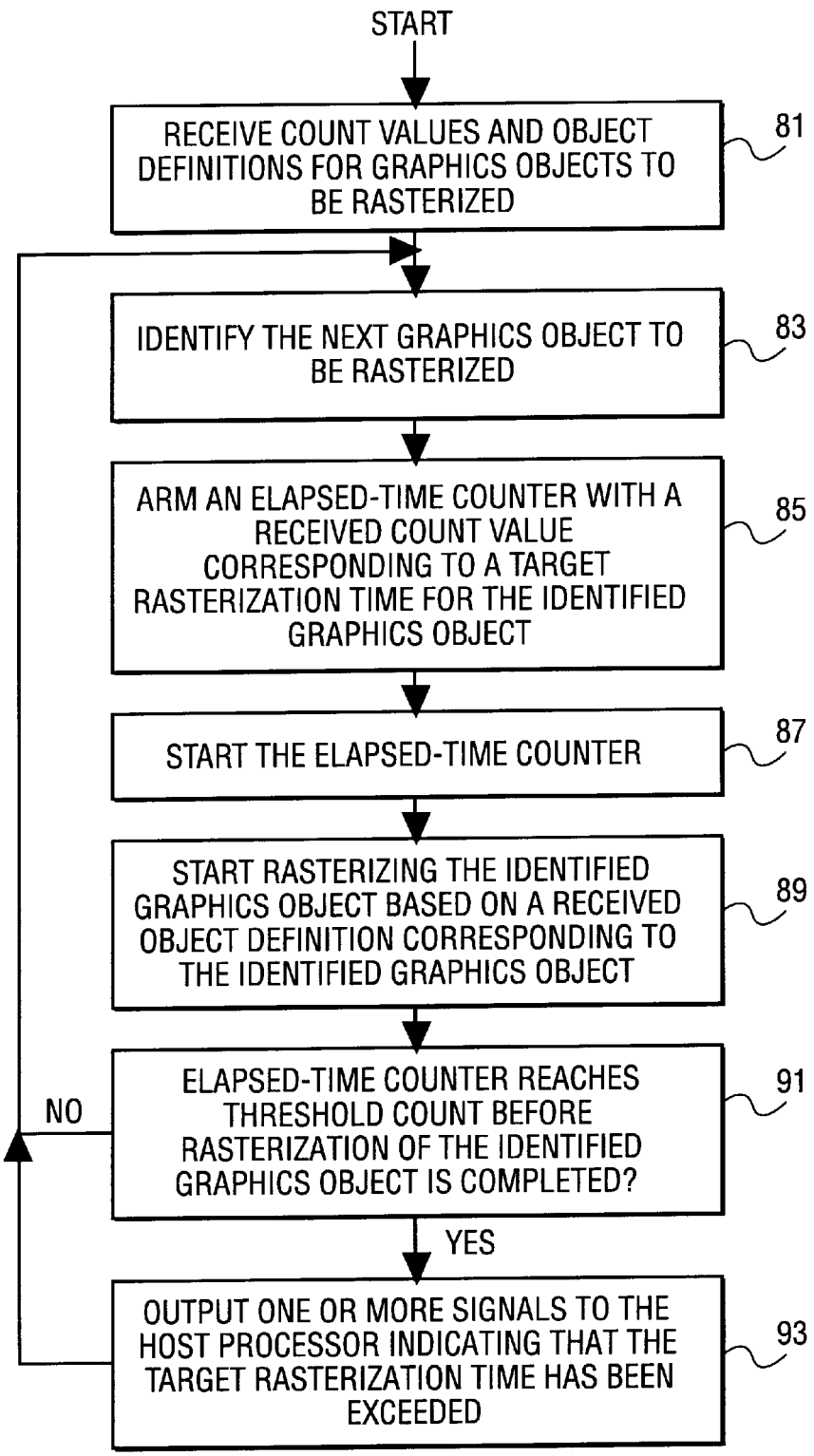
FIG. 7 is a flow diagram of a method for rasterizing graphics objects.

FIG. 7 is a flow diagram of a method for rasterizing graphics objects according to one embodiment of the present invention. At step 81, count values and object definitions for graphics objects to be rasterized are received in the data buffer of the rasterizer. At step 83, the rasterizer identifies the next graphics object to be rasterized from the queue of graphics objects in the data buffer. At step 85, the rasterizer arms an elapsed-time counter with a received count value that corresponds to a target rasterization time for the identified graphics object. The elapsed-time counter is started at step 87 and, at step 89, the rasterizer begins rasterizing the identified graphics object. According to one embodiment of the present invention steps 87 and 89 are performed as near in time as possible to provide an accurate measure of rasterization time should rasterization fail to be completed before expiration of the elapsed-time counter. If, at step 90, the elapsed time counter reaches a target count (i.e., expires) before rasterization of the graphics object is completed, then one or more values indicating that the target rasterization time has been exceeded (e.g., an interrupt signal or a value in response to a processor-initiated read operation) are output to the host processor in step 93. If rasterization is completed before the elapsed-time counter reaches the target count, method execution loops back to step 83 to identify the next graphics object to be rasterized. Method execution also loops back to step 83 after the interrupt is asserted to the host processor in step 93.

Figure 8:
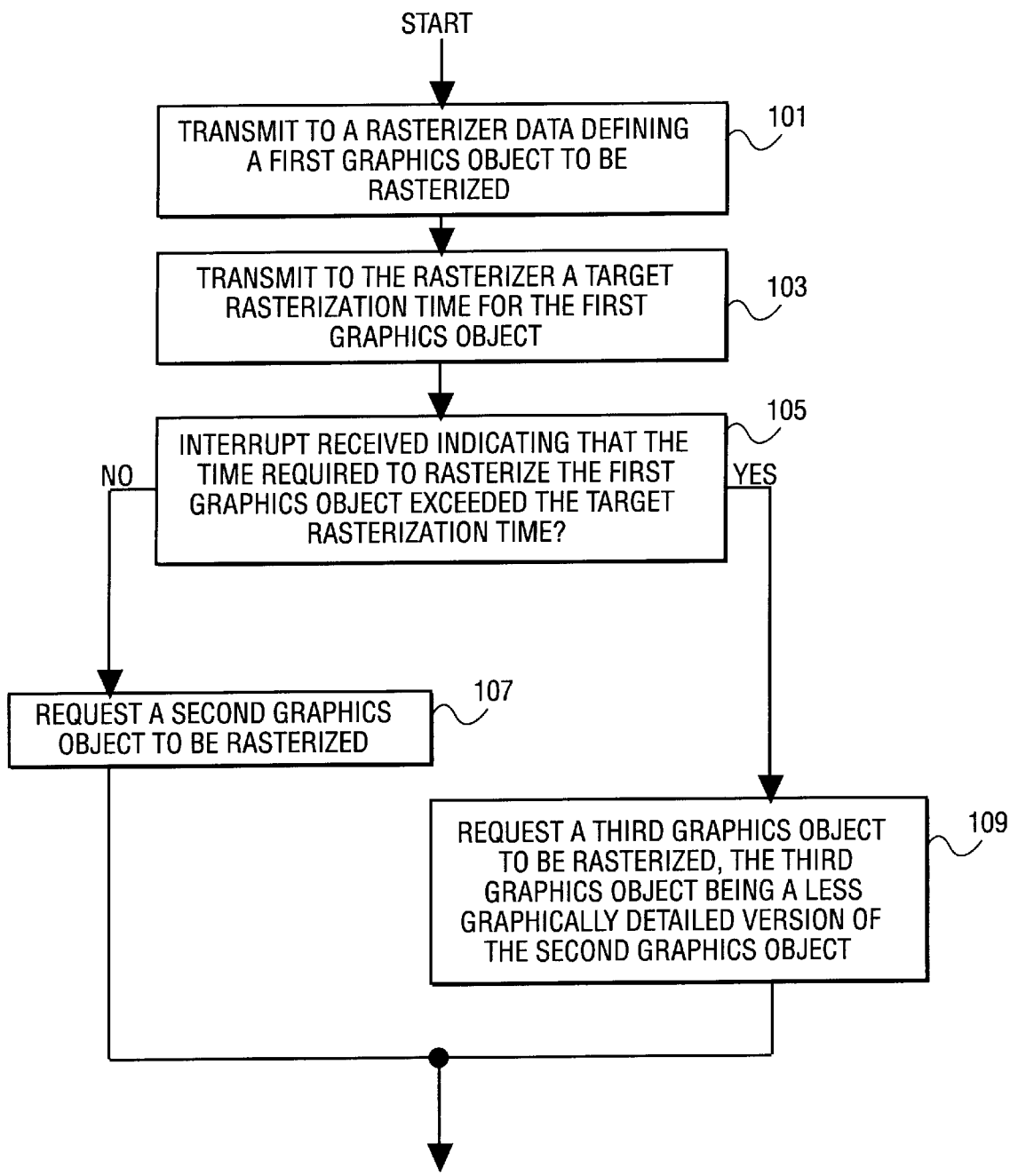
FIG. 8 is a flow diagram of a method for managing scene complexity.

FIG. 8 is a flow diagram of a method for managing scene complexity according to one embodiment of the present invention. At step 101, data defining a first graphics object to be rasterized is transmitted to a rasterizer. In one embodiment of the present invention, transmitting the definitional data to the rasterizer includes the step of writing the data to the tail of a queue in a data buffer in the rasterizer. In an alternate embodiment of the present invention, the data could be written to an area of main memory that is commonly accessible by the host processor and the rasterizer.

At step 103, a target rasterization time for the first graphics object is transmitted to the rasterizer. If, at step 105, an interrupt indicating that the time required to rasterize the first graphics object exceeded the target rasterization time has not been received, then a second graphics object is transmitted to the rasterizer for rasterization in step 107. If, at step 105, an interrupt is received indicating that the target rasterization time has been exceeded, then a third graphics object is transmitted to the rasterizer for rasterization in step 109 instead of the second graphics object. The third graphics object being a less graphically detailed version of the second graphics object.

As discussed above, one application for the apparatus and methods of the present invention is a computer game program that renders 3D scenes onto a video display. When the game software is developed, each of the game's primary characters and other dynamic graphics objects are typically provided in multiple instances having incrementally varied levels of graphical detail. A target rasterization time is assigned to each dynamic graphics object based on a desired frame-rate and a target computer platform. Target rasterization times may either be hard coded during software development or obtained during system run-time, for example, from a modifiable data file, or based on a determination of the processing capability of the host computer system.

According to one embodiment of the present invention, the constituent objects of a video frame are ordered in terms of visual importance in the frame (e.g., based on proximity to the point of view), and respective instances of the objects are initially selected such that the frame rasterization time is less than a desired frame period (the desired frame period is the reciprocal of the desired frame rate). This initial selection of object instances can be accomplished based on an anticipated rasterization time that has been pre-computed and associated with each instance (i.e., each level of detail (LOD)) of a given object.

After the initial selection of object instances, a frame may be displayed one object after another by loading the rasterizer's elapsed-time counter with the time associated with the LOD of an object, starting the counter and starting rasterization of the object. If rasterization of the object does not complete before the counter expires, the LOD for the next object to be rasterized is reduced (i.e., a less graphically detailed version of the next object to be rasterized is selected). Alternately, the LOD of the present object may be reduced to lower the rasterization time of the object in a subsequent frame. In either case, if the total time required to rasterize the frame is less than the desired frame period, the LOD of one or more of the objects in the frame may be increased. By dynamically reducing or increasing the LOD of graphic objects in this manner, a desired frame rate and an appropriate level of graphical detail can be achieved. In this way, a graphics application program can dynamically compensate for frame-to-frame changes in graphical complexity and for time-varying processing bandwidth (e.g., caused by parallel processing) to achieve a relatively constant frame-rate.

Having described methods for practicing the present invention, it should be noted that the individual steps therein may be performed by a processor programmed with instructions that cause the processor to perform the recited steps, specific hardware components that contain hard-wired logic for performing the recited steps, or any combination of programmed computer components and custom hardware components. Nothing disclosed herein should be construed as limiting the present invention to a single embodiment wherein the recited steps are performed by a specific combination of hardware components. Moreover, in the case of a programmed processor implementation, sequences of instructions which may be executed by a processor to carry out the method of the present invention may be stored and distributed on a computer readable medium or may be transmitted on a transmission media via a carrier wave.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method comprising the steps of:

requesting a first graphics object to be rasterized within a predetermined rasterization time;

determining if the first graphics object is rasterized within the predetermined rasterization time;

requesting a second graphics object to be rasterized if the first graphics object is rasterized within the predetermined rasterization time; and requesting a third graphics object to be rasterized instead of the second graphics object if the first graphics object is not rasterized within the predetermined rasterization time, the third graphics object requiring less rasterization time than the second graphics object.

2. The method of claim 1 wherein the step of requesting a first graphics object to be rasterized within a predetermined rasterization time includes the step of sending a request to a rasterizer to rasterize the first graphics object, the request including a count value indicating a number of clock signal transitions within which the first graphics object is to be rasterized.

3. The method of claim 2 wherein the step of determining if the first graphics object is rasterized within the predetermined rasterization time includes the step of receiving an interrupt from the rasterizer if the first graphics object is not rasterized within the number of clock signal transitions.

4. The method of claim 2 wherein the step of determining if the first graphics object is rasterized within the predetermined rasterization time includes the step of reading a counter to determine if the counter has counted the number of clock signal transitions indicated by the count value before rasterization of the first graphics object is completed.

5. An apparatus comprising:

a first graphics object to be rasterized within a predetermined rasterization time;

a counter for determining if the first graphics object is rasterized within the predetermined rasterization time;

a second graphics object to be rasterized if the first graphics object is rasterized within the predetermined rasterization time; and a third graphics object to be rasterized instead of the second graphics object if the first graphics object is not rasterized within the predetermined rasterization time, the third graphics object requiring less rasterization time than the second graphics object.

6. The apparatus of claim 5 wherein the first graphics object to be rasterized within a predetermined rasterization time is requested to be rasterized by sending a request to a rasterizer to rasterize the first graphics object, the request including a count value indicating a number of clock signal transitions within which the first graphics object is to be rasterized.

7. The apparatus of claim 6 wherein the rasterizer sends a signal to a processor if the first graphics object is not rasterized within the number of clock signal transitions.

8. The apparatus of claim 6 wherein the counter counts the number of clock signal transitions for comparison to the count value before rasterization to determine if the first graphics object is rasterized within the predetermined rasterization time.

9. A computer system comprising:

at least one processor;

a storage device coupled to the at least one processor, a first graphics object stored in the storage device to be rasterized within a predetermined rasterization time;

a counter for determining if the first graphics object is rasterized within the predetermined rasterization time;

a second graphics object stored in the storage device to be rasterized if the first graphics object is rasterized within the predetermined rasterization time; and a third graphics object stored in the storage device to be rasterized instead of the second graphics object if the first graphics object is not rasterized within the predetermined rasterization time, the third graphics object requiring less rasterization time than the second graphics object.

10. The computer system of claim 9 wherein the first graphics object to be rasterized within a predetermined rasterization time is requested to be rasterized by the processor sending a request to a rasterizer to rasterize the first graphics object, the request including a count value indicating a number of clock signal transitions within which the first graphics object is to be rasterized.

11. The apparatus of claim 10 wherein the rasterizer sends a signal to the processor if the first graphics object is not rasterized within the number of clock signal transitions.

12. The apparatus of claim 10 wherein a counter counts the number of clock signal transitions for comparison to the count value before rasterization to determine if the first graphics object is rasterized within the predetermined rasterization time.

13. An apparatus comprising:

means for requesting a first graphics object to be rasterized within a predetermined rasterization time;

means for determining if the first graphics object is rasterized within the predetermined rasterization time;

means for requesting a second graphics object to be rasterized if the first graphics object is rasterized within the predetermined rasterization time; and means for requesting a third graphics object to be rasterized instead of the second graphics object if the first graphics object is not rasterized within the predetermined rasterization time, the third graphics object requiring less rasterization time than the second graphics object.

14. The apparatus of claim 13 wherein the means of determining if the first graphics object is rasterized within the predetermined rasterization time includes means for receiving an interrupt from the rasterizer if the first graphics object is not rasterized within the number of clock signal transitions.

* * * * *